US011874616B2

(12) United States Patent
Son

(10) Patent No.: US 11,874,616 B2
(45) Date of Patent: Jan. 16, 2024

(54) DEVELOPER CONVEYING MECHANISM, AND DEVELOPING DEVICE AND IMAGE FORMING APPARATUS PROVIDED THEREWITH

(71) Applicant: KYOCERA Document Solutions Inc., Osaka (JP)

(72) Inventor: Geki Son, Osaka (JP)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 0 days.

(21) Appl. No.: 18/167,632

(22) Filed: Feb. 10, 2023

(65) Prior Publication Data

US 2023/0259051 A1 Aug. 17, 2023

(30) Foreign Application Priority Data

Feb. 17, 2022 (JP) ................................ 2022-022743

(51) Int. Cl.
*G03G 15/08* (2006.01)
*G03G 15/01* (2006.01)

(52) U.S. Cl.
CPC ..... *G03G 15/0898* (2013.01); *G03G 15/0121* (2013.01); *G03G 15/0817* (2013.01); *G03G 15/0881* (2013.01); *G03G 15/0886* (2013.01); *G03G 15/0887* (2013.01); *G03G 2215/067* (2013.01); *G03G 2215/0692* (2013.01)

(58) Field of Classification Search
CPC ........... G03G 15/0121; G03G 15/0817; G03G 15/0881; G03G 15/0886; G03G 15/0898; G03G 2215/067; G03G 2215/0692
See application file for complete search history.

(56) References Cited

U.S. PATENT DOCUMENTS

2011/0318056 A1* 12/2011 Ozaki ................ G03G 15/0886 399/119
2012/0321341 A1* 12/2012 Hori ................... G03G 15/0872 399/110
2014/0064794 A1* 3/2014 Takahashi .......... G03G 15/0865 399/262

FOREIGN PATENT DOCUMENTS

JP 2000-315041 A 11/2000

* cited by examiner

*Primary Examiner* — Joseph S Wong
(74) *Attorney, Agent, or Firm* — Stein IP, LLC

(57) ABSTRACT

A developer conveying mechanism includes a pipe-shaped conveying path that conveys developer and includes a discharge port formed in part of a side surface thereof, a shutter that is slidably attached to the pipe-shaped conveying path and that is selectively arranged at a closing position overlapping with the discharge port and an opening position retreated from the discharge port, a seal member that is fixed to a seal affixing surface of the shutter, and a biasing member that biases the shutter toward the closing position. The shutter includes the seal affixing surface, which is a flat surface, and a pair of engagement portions that are opposite to each other across the seal affixing surface in a circumferential direction of the pipe-shaped conveying path. The pipe-shaped conveying path includes a pair of guide ribs with which the pair of engagement portions slidably engage.

9 Claims, 10 Drawing Sheets

DEVELOPER CONVEYING MECHANISM, AND DEVELOPING DEVICE AND IMAGE FORMING APPARATUS PROVIDED THEREWITH

INCORPORATION BY REFERENCE

This application is based on and claims the benefit of priority from Japanese Patent Application No. 2022-022743 filed on Feb. 17, 2022, the contents of which are hereby incorporated by reference.

BACKGROUND

The present disclosure relates to a developer conveying mechanism for use in image forming apparatuses such a copier, a printer, a facsimile machine, a multifunction peripheral having these functions, etc., and in particular relates to a mechanism that opens and closes a developer discharge port formed in a path through which developer is conveyed.

Conventionally, in developing devices adopting a two-component developing system, to prevent degradation in charging performance of carrier, a developing device has been proposed that supplies fresh developer including carrier into a development container and that includes a developer discharge portion that discharges surplus developer. In such a developing device, at an initial stage of driving, it is necessary to prevent occurrence of damage due to friction between members such as a developing roller and the like, and thus, an amount of developer sufficient to form a toner layer on the developing roller is loaded in advance. Thus, when the developing device is shipped either by being mounted in the main body of an image forming apparatus or by being packed separately from the main body of the image forming apparatus, due to shaking and impact during transportation may cause the developer stored in the developing device to leak and splash from the developer discharge portion to stain an inside of the image forming apparatus.

This inconvenience has generally been addressed by attaching a shutter to the developer discharge portion of the developing device to close a discharge port such that, in setting up the image forming apparatus, the developing device is mounted in the main body of the image forming apparatus after the shutter is opened, or the shutter of the developing device is opened after the developing device is mounted in the main body of the image forming apparatus.

SUMMARY

According to one aspect of the present disclosure, a developer conveying mechanism includes a pipe-shaped conveying path, a shutter, a seal member, and a biasing member. The pipe-shaped conveying path has a developer conveyed therethrough and has a discharge port formed in part of a side surface thereof. The shutter is slidably attached along an outer circumferential surface of the pipe-shaped conveying path, and is selectively arranged at a closing position overlapping with the discharge port and an opening position retreated from the discharge port. The seal member is fixed to a seal affixing surface of the shutter, the seal affixing surface arranged opposite to the discharge port. The biasing member biases the shutter toward the closing position. The shutter includes the seal affixing surface, which is a flat surface, and a pair of engagement portions that are opposite to each other across the seal affixing surface in a circumferential direction of the pipe-shaped conveying path. The pipe-shaped conveying path includes a pair of guide ribs that are opposite to each other across the discharge port in the circumferential direction of the pipe-shaped conveying path, and with which the pair of engagement portions slidably engage.

DETAILED DESCRIPTION

Figure 1:
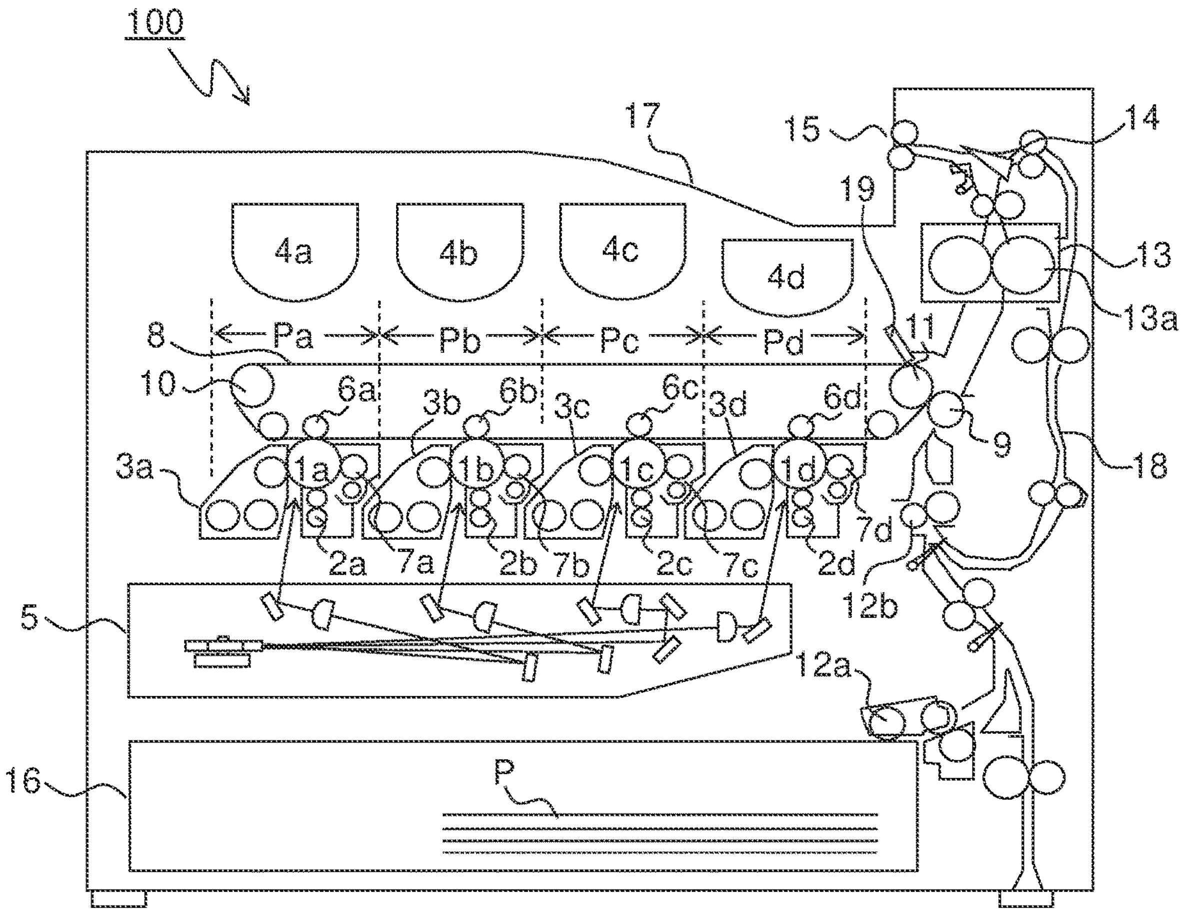
FIG. 1 is a schematic diagram showing an overall structure of a color printer.

Hereinafter, embodiments of the present disclosure will be described with reference to the accompanying drawings. FIG. 1 is a schematic sectional view of an image forming apparatus according to the present disclosure, and illustrated here is a tandem-type color printer. In a main body of a color printer 100, four image forming portions Pa, Pb, Pc, and Pd are arranged in this order from an upstream side in a conveyance direction (a left side in FIG. 1). These image forming portions Pa to Pd are provided corresponding to images of four different colors (cyan, magenta, yellow, and black), and sequentially form images of cyan, magenta, yellow, and black through charging, exposure, developing, and transfer processes.

The image forming portions Pa, Pb, Pc, and Pd include photosensitive drums 1*a*, 1*b*, 1*c*, and 1*d*, respectively, which carry visible images (toner images) of respective colors. There is further disposed an intermediate transfer belt 8 adjacent to the image forming portions Pa to Pd, and the intermediate transfer belt 8 is rotatable counterclockwise in FIG. 1. The intermediate transfer belt 8 is wound around and between a tension roller 10 located on an upstream side and a driving roller 11 located on a downstream side. Downstream of the image forming portion Pd with respect to a rotation direction of the intermediate transfer belt 8, there is arranged a belt cleaner 19 that is blade-shaped and that is opposite to the driving roller 11 with the intermediate transfer belt 8 therebetween.

When image data is received from a host device such as a personal computer, first, charging devices 2*a* to 2*d* uniformly charge the surfaces of the photosensitive drums 1*a* to 1*d*. Then, an exposure device 5 irradiates the photosensitive drums 1*a* to 1*d* with light according to the image data, so that electrostatic latent images are formed on the photosensitive drums 1*a* to 1*d* corresponding to the image data. Developing devices 3*a* to 3*d* are each loaded with a predetermined amount of two-component developer (hereinafter also referred to simply as developer) including toner of cyan, magenta, yellow, or black. The toner included in the developer is supplied from the developing devices 3*a* to 3*d* to the photosensitive drums 1*a* to 1*d*, and electrostatically attaches to them. In this manner, toner images are formed corresponding to the electrostatic latent images formed by exposure to light from the exposure device 5.

Then, primary transfer rollers 6*a* to 6*d* generate an electric field with a predetermined transfer voltage between the primary transfer rollers 6*a* to 6*d* and the photosensitive drums 1*a* to 1*d*. As a result, the cyan, magenta, yellow, and black toner images on the photosensitive drums 1*a* to 1*d* are primarily transferred to the intermediate transfer belt 8. After the primary transfer, residual toner and the like left on the surfaces of the photosensitive drums 1*a* to 1*d* are removed by cleaning devices 7*a* to 7*d*.

Transfer sheets P to which toner images are to be transferred are stored in a sheet cassette 16 arranged in a lower part inside the color printer 100. A transfer sheet P is conveyed, via a sheet feeding roller 12*a* and a pair of registration rollers 12*b*, with predetermined timing, to a nip (secondary transfer nip) between a secondary transfer roller 9, which is disposed adjacent to the intermediate transfer belt 8, and the intermediate transfer belt 8. The transfer sheet P to which the toner images have been secondarily transferred is conveyed to a fixing portion 13.

The transfer sheet P conveyed to the fixing portion 13 is heated and pressed by a pair of fixing rollers 13*a* so that the toner image is fixed to the surface of the transfer sheet P, and thereby a predetermined full-color image is formed. The transfer sheet P having the full-color image formed thereon is discharged as it is (or after being directed by a branching portion 14 into a reverse conveying path 18 and having an image formed on its other side as well) onto a discharge tray 17 via a pair of discharge rollers 15.

Figure 2:
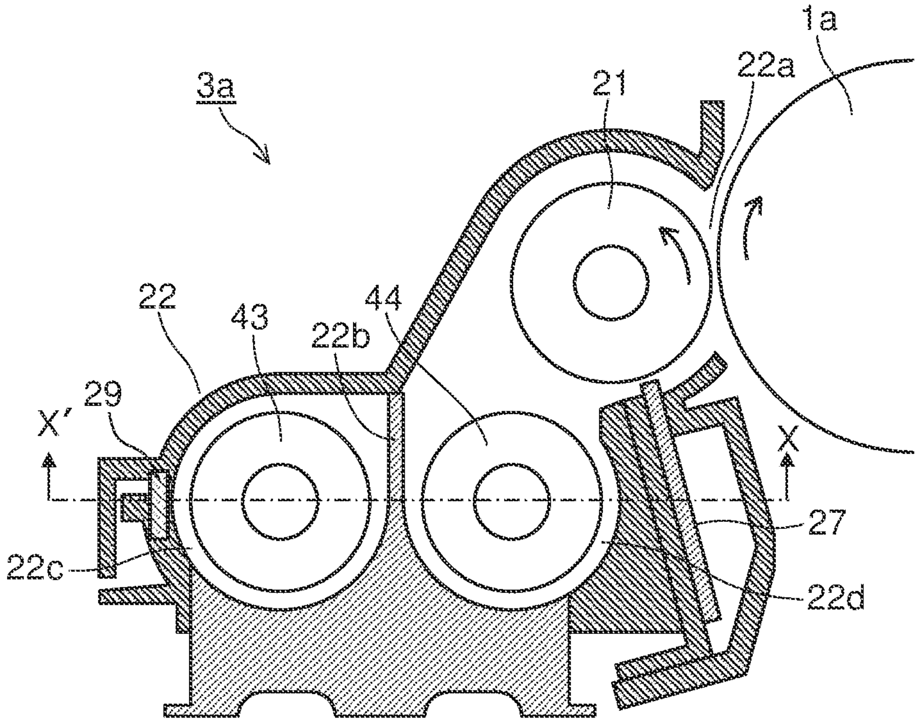
FIG. 2 is a side sectional view of a developing device incorporated in the color printer.

FIG. 2 is a side sectional view showing a structure of the developing device 3*a* that is used in the above-described color printer 100 and that includes a developer conveying mechanism according to the present disclosure. The following description to be given with reference to FIG. 2 and later-mentioned FIG. 3 will deal with the structure and operation of the developing device 3*a* corresponding to the photosensitive drum 1*a* shown in FIG. 1, and no overlapping description will be repeated regarding the developing devices 3*b* to 3*d*, which are similar in structure and operation to the developing device 3*a*.

As shown in FIG. 2, the developing device 3*a* includes a development container 22 in which two-component developer (hereinafter also referred to simply as developer) including a magnetic carrier and toner is stored. The development container 22 is separated by a partition wall 22*b* into a first conveying chamber 22*c* and a second conveying chamber 22*d*. In the first conveying chamber 22*c* and the second conveying chamber 22*d*, a stirring-conveying screw 43 and a supplying-conveying screw 44, respectively, are rotatably arranged for mixing and stirring the toner supplied from the toner container 4*a* (see FIG. 1) with the magnetic carrier to charge the toner.

Then, the developer is conveyed, while being stirred, by the stirring-conveying screw 43 and the supplying-conveying screw 44 in their axial directions (directions perpendicular to the plane of the sheet on which FIG. 2 is drawn), to circulate between the first conveying chamber 22*c* and the second conveying chamber 22*d* via an upstream-side communication portion 22*e* and a downstream-side communication portion 22*f* (see FIG. 3) formed at opposite end parts of the partition wall 22*b*. That is, the first conveying chamber 22*c*, the second conveying chamber 22*d*, the upstream-side communication portion 22*e*, and the downstream-side communication portion 22*f* together form a developer circulation path inside the development container 22.

The development container 22 extends diagonally up rightward in FIG. 2, and inside the development container 22, a developing roller 21 is arranged diagonally to the upper right of the supplying-conveying screw 44. The developing roller 21 has part of an outer circumferential surface thereof exposed through an opening 22*a* of the development container 22 to be opposite to the photosensitive drum 1*a* with a predetermined space (a development gap) therebetween. The developing roller 21 rotates counterclockwise in FIG. 2 (trail rotation at the opposing position with respect to the photosensitive drum 1*a*).

The developing roller 21 includes a developing sleeve having a cylindrical shape and rotatable counterclockwise in FIG. 2, and a magnet (not shown) that is fixed inside the developing sleeve and has a plurality of magnetic poles. Used here as the developing sleeve is one having a knurled surface, but instead, there can be used one having a large number of concave shapes (dimples) formed in a surface thereof, one having a blasted surface, or further, one that has a knurled surface or a surface with concave shapes and that is further blasted or plated. A developing voltage composed of a DC voltage and an AC voltage is applied to the developing roller 21 by a developing voltage power supply (not shown).

In the development container 22, a regulation blade 27 is attached along a longitudinal direction of the developing roller 21 (a direction perpendicular to the plane of the sheet on which FIG. 2 is drawn). Between a leading-edge part of the regulation blade 27 and an outer circumferential surface of the developing roller 21, a small space (gap) is formed. In this embodiment, used as the regulation blade 27 is a magnetic blade made of stainless steel (SUS430).

On a side surface of the first conveying chamber 22*c*, a toner concentration sensor 29 is arranged opposite to the stirring-conveying screw 43. The toner concentration sensor 29 detects toner concentration (a mixture ratio of toner to carrier in the developer; T/C) in the developer inside the development container 22. Used as the toner concentration sensor 29 is, for example, a magnetic permeability sensor that detects a magnetic permeability of the two-component developer including the toner and the magnetic carrier inside the development container 22. Based on a toner concentration detected by the toner concentration sensor 29, the toner inside the toner container 4*a* (see FIG. 1) is replenished together with the carrier into the development container 22 via a developer replenishing port 22*g* (see FIG. 3).

Next, with reference to FIG. 3, a detailed description will be given of a stirring portion of the developing device 3*a*.

Figure 3:
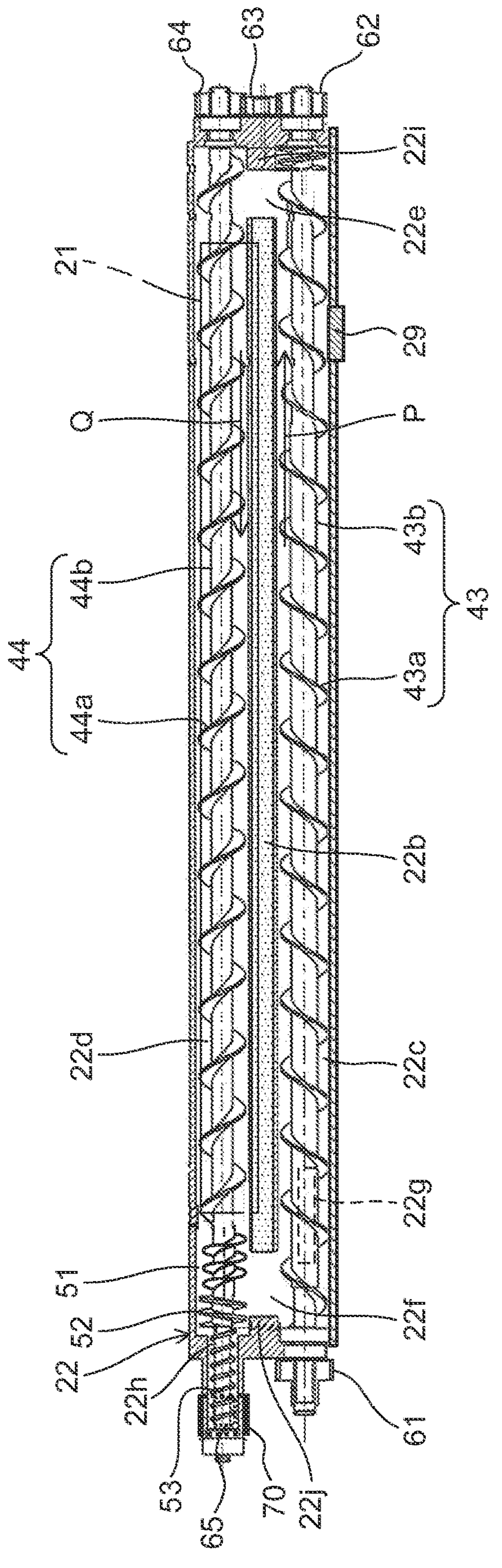
FIG. 3 is a sectional plan view showing a stirring portion of the developing device.

FIG. 3 is a sectional plan view (taken along line XX' of FIG. 2) showing the stirring portion of the developing device 3*a*.

In the developing container 22, as described previously, the first conveying chamber 22*c*, the second conveying chamber 22*d*, the partition wall 22*b*, the upstream-side communication portion 22*e*, and the downstream-side communication portion 22*f* are formed, and in addition to these, there are further formed the developer replenishing port 22*g*, a developer discharge portion 22*h*, an upstream-side wall portion 22*i*, and a downstream-side wall portion 22*j*. In the first conveying chamber 22*c*, the left side in FIG. 3 is assumed to be the upstream side, and the right side in FIG. 3 is assumed to be the downstream side, while in the second conveying chamber 22*d*, the right side in FIG. 3 is assumed to be the upstream side and the left side in FIG. 3 is assumed to be the downstream side. Accordingly, the communication portions and the wall portions are denoted with "upstream-side" or "downstream-side" based on the second conveyance chamber 22*d*.

The partition wall 22*b* extends in a longitudinal direction of the developing container 22 to separate the first conveying chamber 22*c* and the second conveying chamber 22*d* to be parallel to each other. A right end part of the partition wall 22*b* in a longitudinal direction thereof, together with an inner wall portion of the upstream-side wall portion 22*i*, forms the upstream-side communication portion 22*e*. On the other hand, a left end part of the partition wall 22*b* in the longitudinal direction thereof, together with an inner wall portion of the downstream-side wall portion 22*j*, forms the downstream-side communication portion 22*f* The developer circulates in the developing container 22 by sequentially passing through the first conveying chamber 22*c*, the upstream-side communication portion 22*e*, the second conveying chamber 22*d*, and the downstream-side communication portion 22*f*.

The developer replenishing port 22*g* is an opening through which fresh toner and carrier are replenished into the developing container 22 from the toner container 4*a* (see FIG. 1) formed above the development container 22, and is arranged on an upstream side (the left side in FIG. 3) of the first conveying chamber 22*c*.

The developer discharge portion 22*h*, which is a portion for discharging therethrough surplus developer caused in the first conveying chamber 22*c* and the second conveying chamber 22*d* by the replenishment of the toner and the carrier thereto, is a pipe-shaped conveying path that is cylinder-shaped and disposed continuous with the second conveying chamber 22*d* on the downstream side of the second conveying chamber 22*d* in a longitudinal direction thereof.

Inside the first conveying chamber 22*c*, the stirring-conveying screw 43 is arranged, and inside the second conveying chamber 22*d*, the supplying-conveying screw 44 is arranged.

The stirring-conveying screw 43 includes a rotation shaft 43*b* and a first helical blade 43*a* that is formed integrally with the rotation shaft 43*b* and in a helical shape with a constant pitch in an axial direction of the rotation shaft 43*b*. The first helical blade 43*a* extends to opposite end parts of the first conveying chamber 22*c* in the longitudinal direction so as to be opposite also to the upstream-side and downstream-side communication portions 22*e* and 22*f* The rotation shaft 43*b* is rotatably supported by the upstream-side wall portion 22*i* and the downstream-side wall portion 22*j* of the development container 22.

The supplying-conveying screw 44 includes a rotation shaft 44*b* and a second helical blade 44*a* that is formed integrally with the rotation shaft 44*b* and in a helical shape with a blade wound with the same pitch as the first helical blade 43*a* in an axial direction of the rotation shaft 44*b* but facing a direction opposite (being in a phase opposite) to the first helical blade 43*a*. The second helical blade 44*a* has a length equal to or longer than that of the magnetic roller 21 in the axial direction thereof, and further extends to a position facing the upstream-side communication portion 22*e*. The rotation shaft 44*b* is arranged parallel to the rotation shaft 43*b*, and rotatably supported by the upstream-side wall portion 22*i* and the downstream-side wall portion 22*j* of the development container 22.

The rotation shaft 44*b* has integrated therewith, in addition to the second helical blade 44*a*, a decelerating conveying portion 51, a regulation portion 52, and a discharge blade 53.

The decelerating conveying portion 51 is helically formed of a plurality of (here, three) blades facing the same direction as the second helical blade 44*a*. The helical blades of the decelerating conveying portion 51 are set to have an external diameter equal to that of the second helical blade 44*a*, with a pitch smaller than that of the second helical blade 44*a*.

The regulation portion 52 blocks developer conveyed to the downstream side inside the second conveying chamber 22*d*, and also conveys developer of a surplus amount, by which the amount of developer exceeds a predetermined amount, to the developer discharge portion 22*h*. The regulation portion 52 is a helical blade disposed on the rotation shaft 44*b*, and is formed in a helical shape with a blade facing a direction (being in a phase) opposite to the winding direction of the second helical blade 44*a*, and is also formed with substantially the same external diameter as, and with a smaller pitch than, the second helical blade 44*a*. Furthermore, the regulation portion 52 is disposed such that a gap of a predetermined size is formed between an inner wall part of the development container 22 including the downstream-side wall portion 22*j* and an outer peripheral part of the regulation portion 52. The developer of the surplus amount is discharged through this gap.

Inside the developer discharge portion 22*h*, the rotation shaft 44*b* is provided with the discharge blade 53. The discharge blade 53 is formed as a helical blade facing the same direction as the second helical blade 44*a*, but with a pitch and an external diameter smaller than those of the second helical blade 44*a*. Accordingly, when the rotation shaft 44*b* rotates, the discharge blade 53 also rotates, so that the surplus developer that has been conveyed over the regulation portion 52 into the developer discharge portion 22*h* is further conveyed to the left side in FIG. 3, to be discharged out of the development container 22. Here, the discharge blade 53, the regulation portion 52, the decelerating conveying portion 51, and the second helical blade 44*a* are formed of synthetic resin integrally with the rotation shaft 44*b*.

In a lower part of the developer discharge portion 22*h*, there is formed a discharge port 65 communicating with connecting portions 82*a* to 82*d* (see FIG. 6) of a conveying pipe 82, and to an outer circumferential surface of the developer discharge portion 22*h*, a shutter 70 is attached which opens and closes the discharge port 65.

On an outer wall of the development container 22, gears 61 to 64 are arranged. The gears 61 and 62 are fastened to the rotation shaft 43*b*, the gear 64 is fastened to the rotation shaft 44*b*, and the gear 63 is rotatably held by the development container 22 and meshes with the gears 62 and 64.

Figure 4:
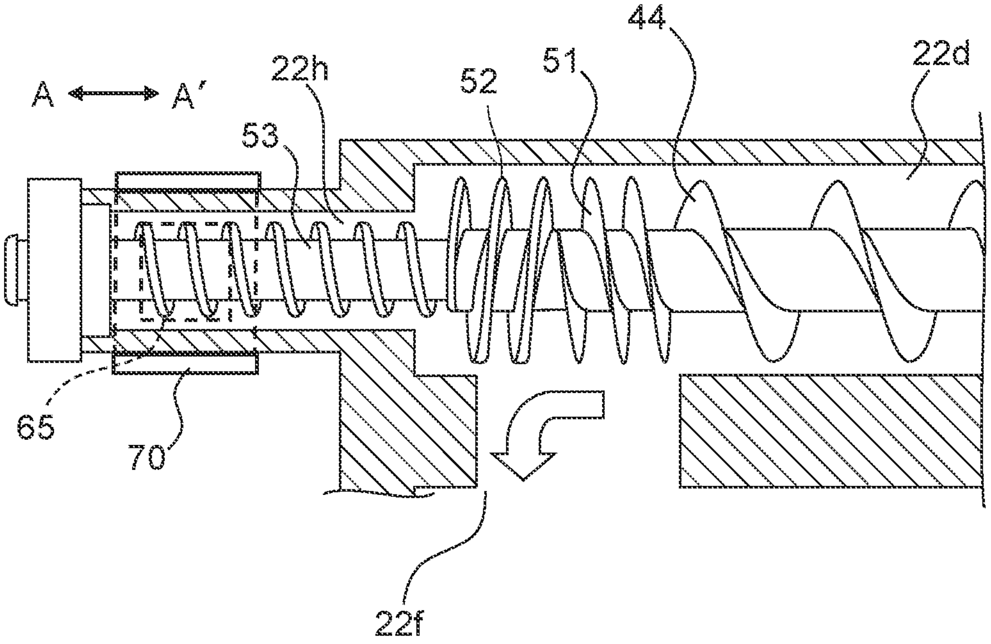
FIG. 4 is an enlarged view around a developer discharge portion in FIG. 3.

FIG. 4 is an enlarge view around the developer discharge portion 22*h* shown in FIG. 3. On the supplying-conveying screw 44, the decelerating conveying portion 51 is disposed immediately close to and upstream of the regulation portion 52 with respect to a developer conveying direction (the white arrow direction in FIG. 4) so as to face the downstream-side communication portion 22*f.*

In a developing operation, during which no developer is replenished afresh, the developer is stirred while circulating from the first conveying chamber 22*c* to the upstream-side communication portion 22*e*, the second conveying chamber 22*d*, and the downstream-side communication portion 22*f*, to be supplied onto the developing roller 21.

When toner is consumed in the developing operation, the developer including the toner and the carrier is replenished through the developer replenishing port 22*g* into the first conveying chamber 22*c*. The replenished developer is, in the same manner as in the developing operation, conveyed by the first helical blade 43*a* in an arrow-P direction inside the first conveying chamber 22*c*, and is then conveyed through the upstream-side communication portion 22*e*, into the second conveying chamber 22*d*. Furthermore, by the second helical blade 44*a*, the developer is conveyed in an arrow-Q direction inside the second conveying chamber 22*d* to be conveyed to the decelerating conveying portion 51. When the regulation portion 52 rotates along with rotation of the rotation shaft 44*b*, the regulation portion 52 applies a conveying force to the developer in a direction opposite to the developer conveying direction in which the second helical blade 44*a* conveys the developer. The developer, after having its conveying speed decelerated by the decelerating conveying portion 51, is blocked and piled up high in the vicinity of the decelerating conveying portion 51 located upstream of the regulation portion 52, and the developer of the surplus amount (approximately the same amount as the amount of developer replenished through the developer replenishing port 22*g*) climbs over the regulation portion 52 to be discharged, via the developer discharge portion 22*h*, out of the development container 22.

Inside the first conveying chamber 22*c*, the toner concentration sensor 29 is arranged. The toner concentration sensor 29 is configured to detect magnetic permeability of the developer and, on detecting the magnetic permeability, outputs, to a control portion (not shown), a voltage of a value corresponding to the detection result. The control portion then determines a toner concentration based on the output value of the toner concentration sensor 29.

The shutter 70 is a flat-plate shaped member that is attached to the developer discharge portion 22*h* to be slidable in an axial direction (an arrow-AA' direction) of the developer discharge portion 22*h*. Between the shutter 70 and the development container 22, a coil spring 75 (see FIG. 9) is arranged. The shutter 70 is biased by the coil spring 75 in a closing direction (an arrow-A direction), and is normally arranged, as shown in FIG. 4, at a position (the closing position) overlapping with the discharge port 65 of the developer discharge portion 22*h*, and thereby closes the discharge port 65.

To an inner surface of the shutter 70, a seal member 76 (see FIG. 9) is fixed, and prevents leakage of the developer through a gap between the outer circumferential surface of the developer discharge portion 22*h* and the shutter 70. The developer discharge portion 22*h*, the shutter 70, the coil spring 75, and the seal member 76 together constitute the developer conveying mechanism according to the present disclosure. Descriptions will be given later of the detailed structures of the discharge port 65, the shutter 70, the seal member 76, etc.

Figure 5:
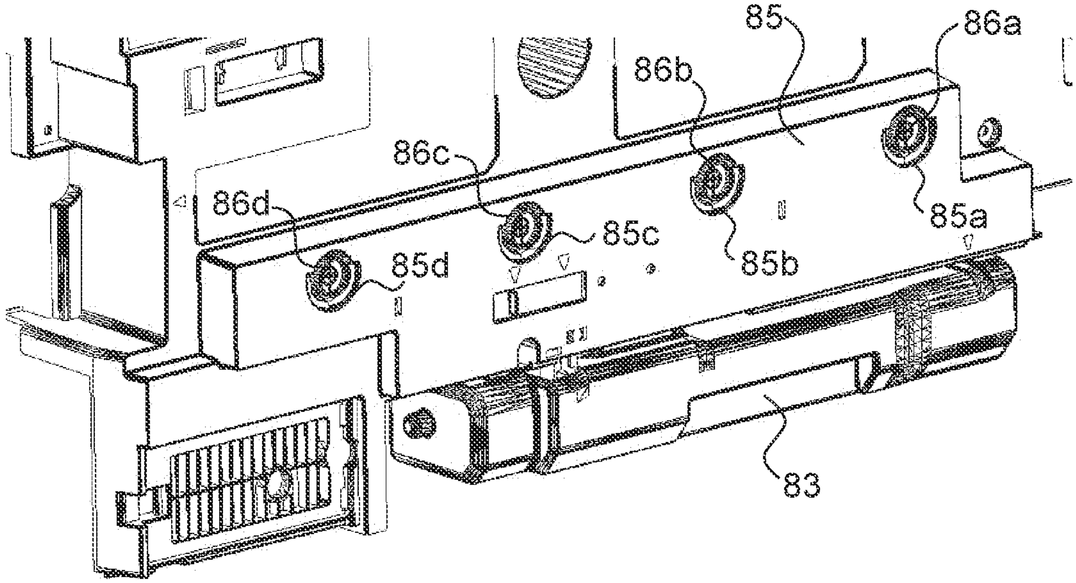
FIG. 5 is a partial perspective view showing a state with a front face side outer cover of the color printer open.
Figure 6:
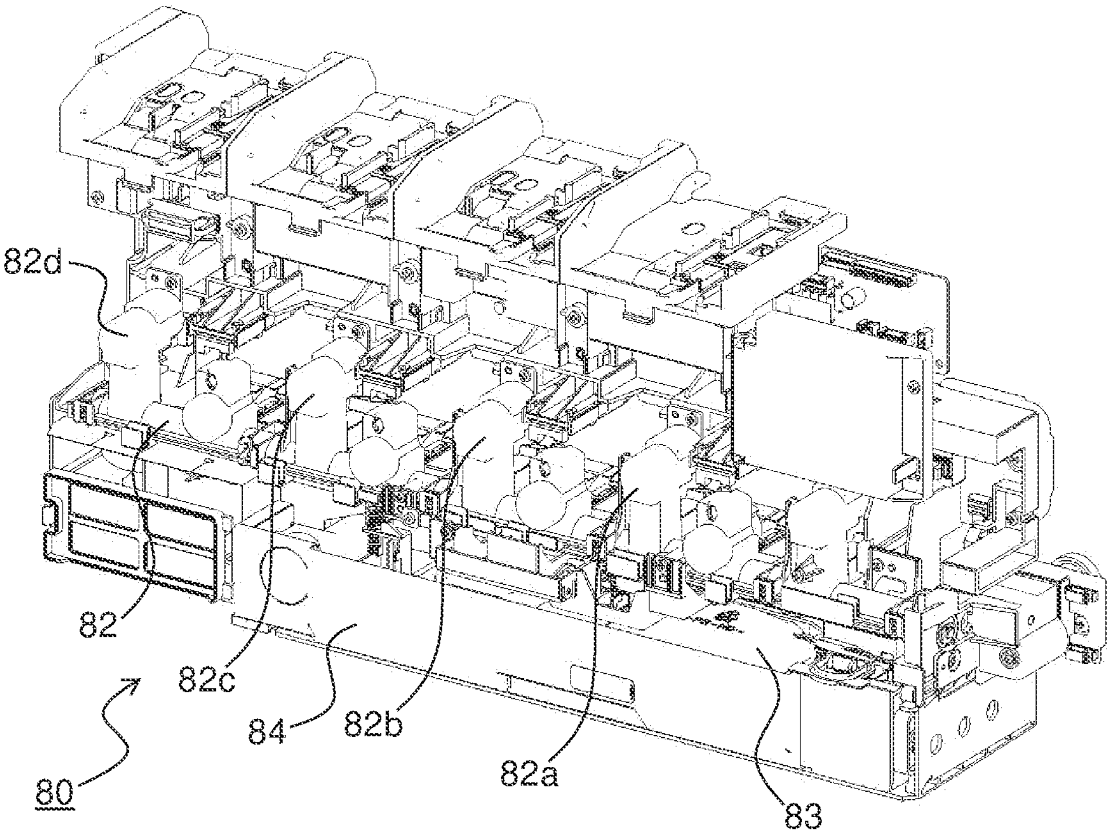
FIG. 6 is a perspective view showing a state with an inner cover in FIG. 5 removed to expose a developer collecting mechanism.
Figure 7:
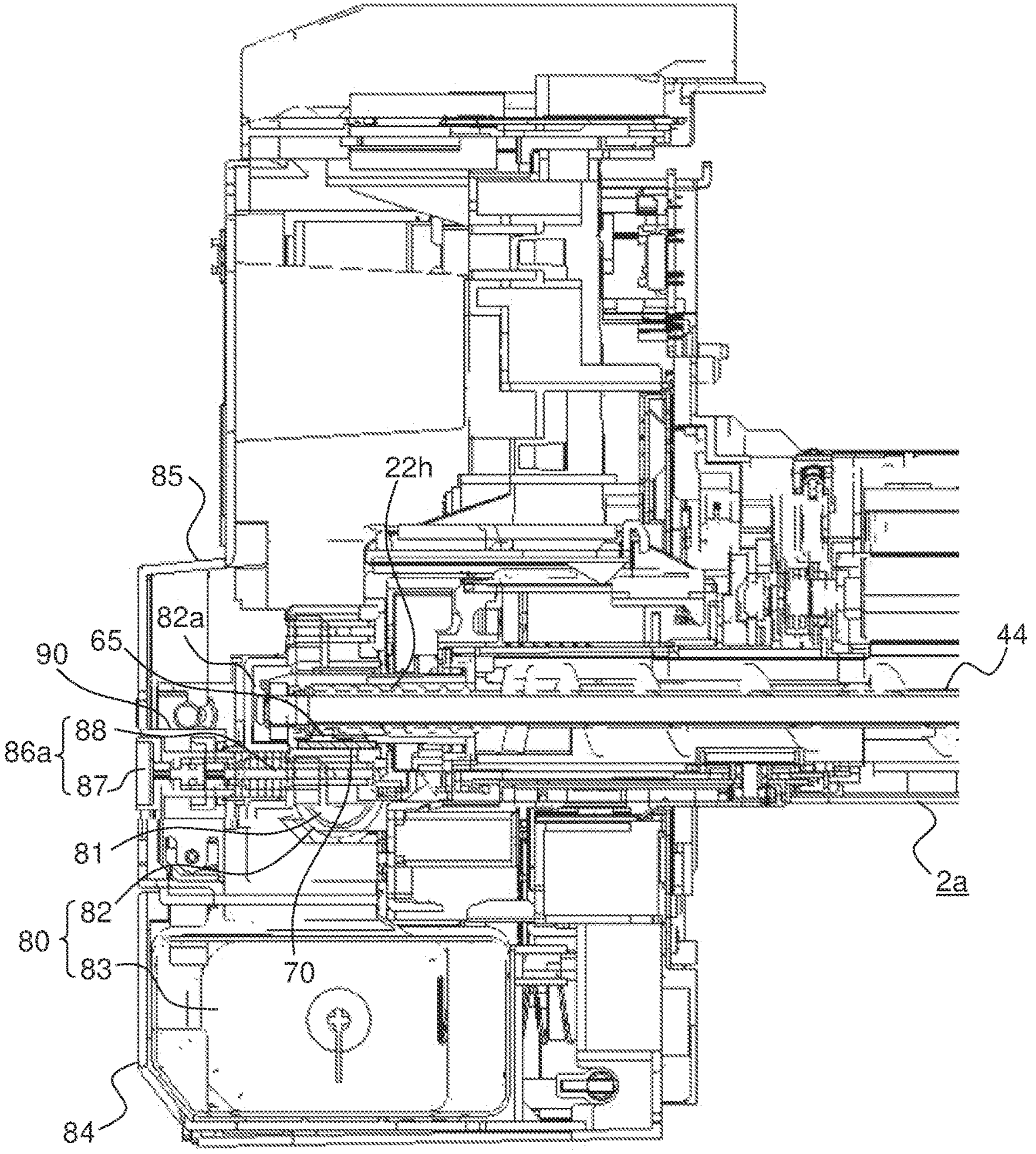
FIG. 7 is a side sectional view of the developer collecting mechanism, showing a state with a discharge port closed by a shutter.

FIG. 5 is a partial perspective view showing a state with a front face-side outer cover of the color printer 100 open, FIG. 6 is a perspective view showing a state with an inner cover 85 shown in FIG. 5 removed to expose a developer collecting mechanism 80, and FIG. 7 is a side sectional view of the developer collecting mechanism 80. In FIG. 6, the developing devices 3*a* to 3*d* are not illustrated. FIG. 7 shows a section taken at a position corresponding to the developing device 3*a.*

The developer collecting mechanism 80 includes the conveying pipe 82, inside which a conveying screw 81 is arranged, and a collecting container 83, in which developer conveyed via the conveying pipe 82 is stored. The collecting container 83 is housed inside a tray 84 (unillustrated in FIG. 5), which is withdrawable. In the conveying pipe 82, there are formed connection portions 82*a* to 82*d* that are connected to the developer discharge portions 22*h* (see FIG. 4) of the developing devices 3*a* to 3*d.*

In the developing devices 3*a* to 3*d*, at positions corresponding to the developer discharge portions 22*h*, pressing members 86*a* to 86*d* are disposed. The pressing members 86*a* to 86*d* are each a screw-shaped member having a head portion 87 and a shaft portion 88. In the inner cover 85, there are formed window portions 85*a* to 85*d* via which the head portions 87 of the pressing members 86*a* to 86*d* are exposed. The pressing members 86*a* to 86*d* are each pressed toward the inner cover 85 (in the arrow-A direction) by the shutter 70 which is biased by the coil spring 75 (see FIG. 4).

FIGS. 5 to 7 each show a state of the color printer 100 during transportation (on shipment). With the developing device 3*a* attached in the color printer 100, as shown in FIG. 7, the discharge port 65 of the developer discharge portion 22*h* is closed by the shutter 70. Thus, if the color printer 100 is transported in this state, there is no risk of leakage of the developer out of the developing devices 3*a* to 3*d* through the discharge ports 65 due to shaking or impact during transportation.

After the color printer 100 is delivered to a user, when a service person performs setup (initial setup) of it, the service person inserts a screwdriver in the head portion 87 of each of the pressing members 86*a* to 86*d*, and pushes it into the inner cover 85 while turning the screwdriver. Here, the shaft portion 88 of each of the pressing members 86*a* to 86*d* and a through hole 90 has a relationship therebetween comparable to the relationship between a key and a key hole, and thus, by inserting the shaft portion 88 into the through hole 90 and turning it by 90°, each of the pressing members 86*a* to 86*d* is fixed at a position to which it has been inserted.

Figure 8:
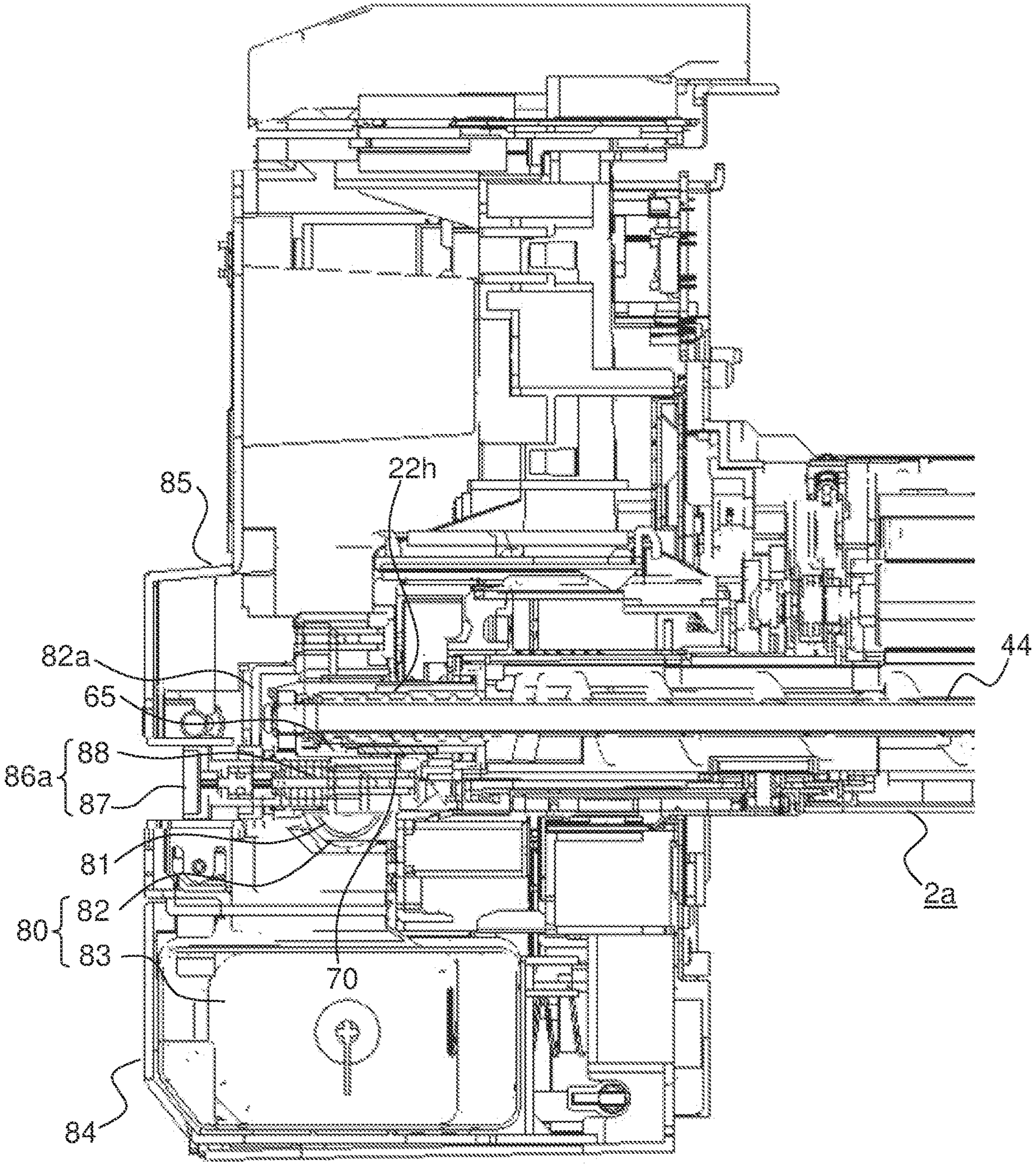
FIG. 8 is a side sectional view of the developer collecting mechanism, showing a state with the discharge port opened by the shutter.

FIG. 8 is a side sectional view of the developer collecting mechanism 80, showing a state with the discharge port 65 opened by the shutter 70. When each of the pressing members 86*a* to 86*d* is pressed into the inner cover 85, the shutter 70 moves in an arrow-A' direction while compressing the coil spring 75 (see FIG. 9), to be arranged at a position (the opening position) retreated from the discharge port 65. As a result, the discharge port 65 of the developer discharge portion 22*h* comes to communicate with the conveying pipe 82, so that the developer can be discharged through the discharge port 65. The developer discharged through the discharge port 65 of the developer discharge portion 22*h* is then conveyed through the conveying pipe 82 by the conveying screw 81 into the collecting container 83 to be stored therein.

According to the structure of the present embodiment, it is possible, with a simple structure, to securely prevent the inside of the color printer 100 from being stained with developer leaked from the developer discharge portion 22*h* when transporting (shipping) the color printer 100 with the developing devices 3*a* to 3*d* loaded with developer. On setup, it is also possible to open the discharge port 65 with a simple operation.

Next, a description will be given of a relationship between the opening/closing operation of the shutter 70 performed on removing the developing devices 3*a* to 3*d* from the color printer 100 and the seal member 76. By inserting a screwdriver in the head portion 87 of each of the pressing members 86*a* to 86*d* and turning it by 90° in a direction reverse to the turning direction in the setup operation, the pressing members 86*a* to 86*d* are pushed back toward the inner cover 85 by a restoring force of the coil spring 75 in the compressed state, and this causes the shutter 70 to move in the arrow-A direction to close the discharge port 65.

Figure 9:
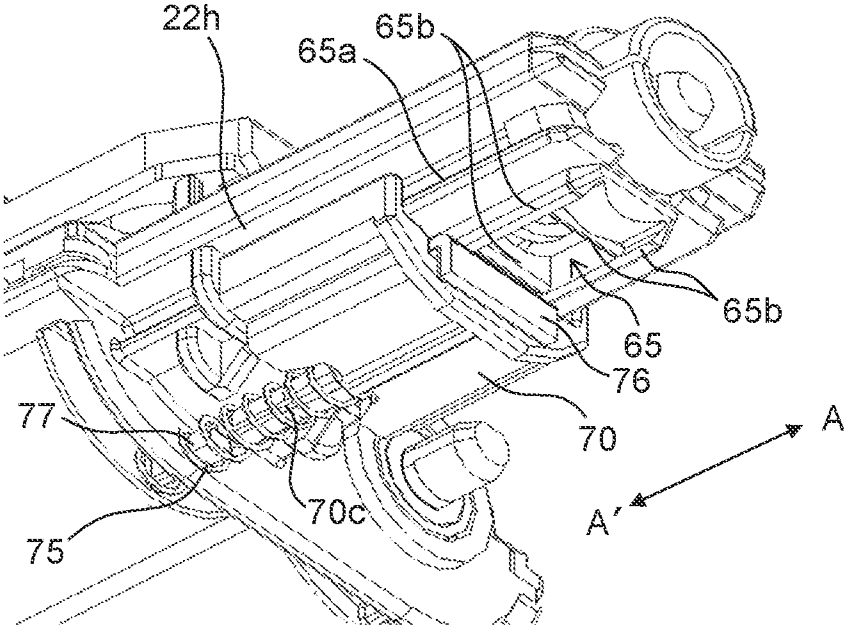
FIG. 9 is a perspective view of the developer discharge portion of the developing device as seen from a side of the discharge port, showing a state with the shutter open.
Figure 10:
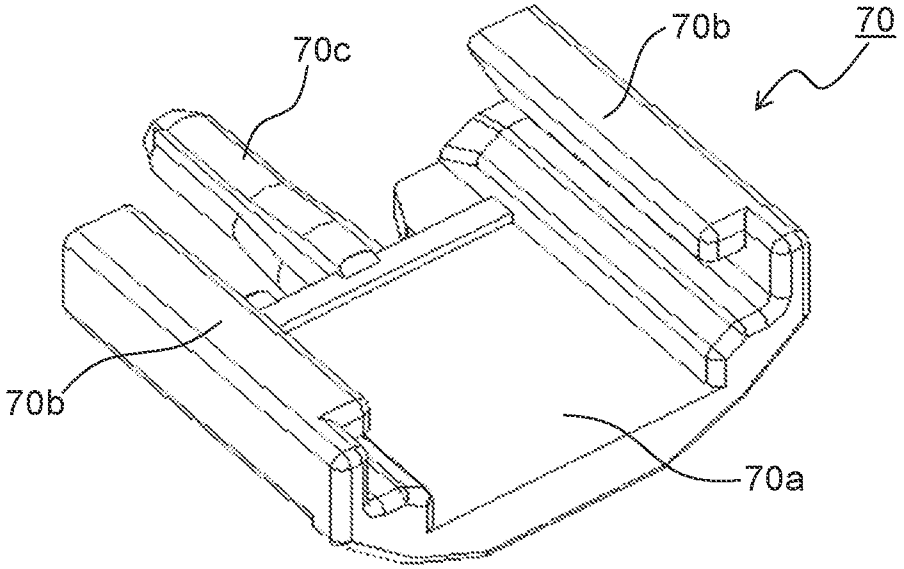
FIG. 10 is a perspective view of the shutter as seen from a side of a seal affixing surface.
Figure 11:
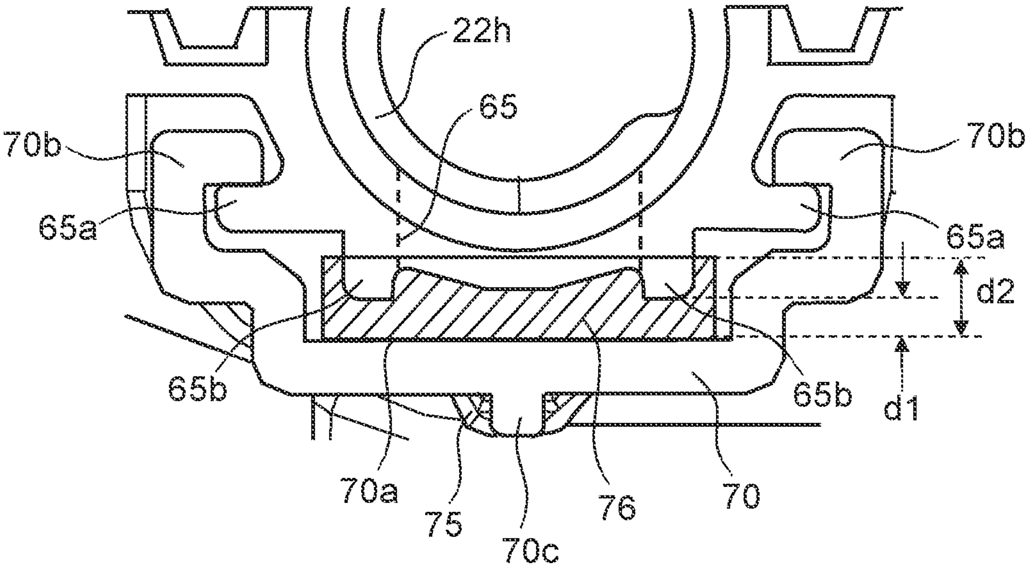
FIG. 11 is a sectional view taken by cutting the developer discharge portion in a radial direction with the discharge port closed by the shutter.
Figure 12:
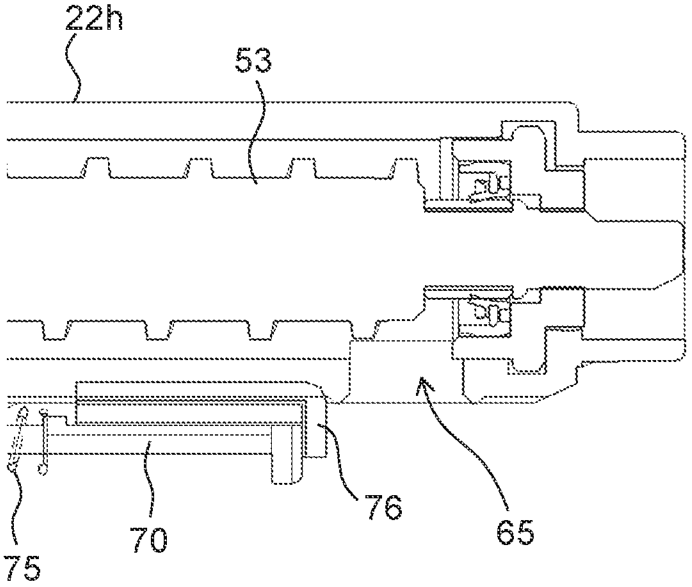
FIG. 12 is a side sectional view taken by cutting the developer discharge portion along an axial direction, showing a state with the shutter arranged at an opening position.
Figure 13:
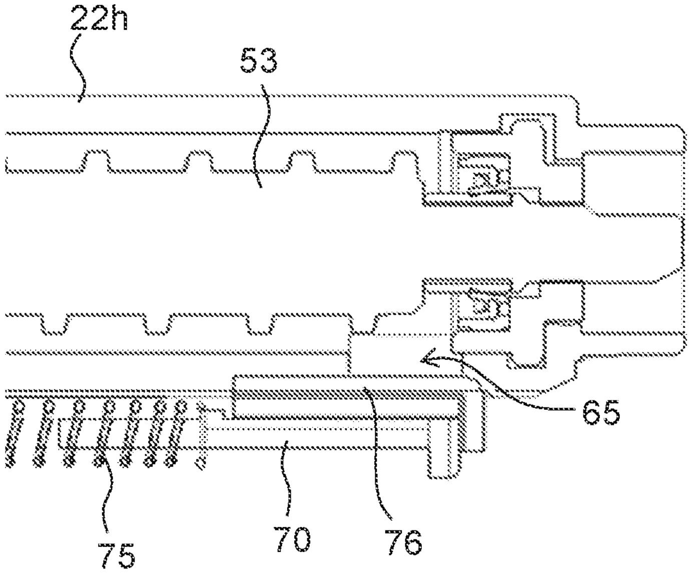
FIG. 13 is a side sectional view taken by cutting the developer discharge portion along the axial direction, showing a state with the shutter arranged at a closing position.

FIG. 9 is a perspective view of the developer discharge portion 22*h* of the developing device 3*a* according to the present embodiment, as seen from a side of the discharge port 65, showing a state with the shutter 70 open. FIG. 10 is a perspective view of the shutter 70 as seen from a side of a seal affixing surface 70*a*. FIG. 11 is a sectional view taken by cutting the developer discharge portion 22*h*, with the discharge port 65 closed by the shutter 70, in a radial direction thereof. FIGS. 12 and 13 are side sectional views taken by cutting the developer discharge portion 22*h* along the axial direction thereof, respectively showing a state with the shutter 70 at the opening position and a state with the shutter 70 at the closing position.

As shown in FIG. 9, the discharge port 65 is a rectangular opening formed in the developer discharge portion 22*h* which is pipe-shaped. Around the discharge port 65, guide ribs 65*a* and pressing protrusions 65*b* are formed. The guide ribs 65*a* are a pair of guide ribs 65*a* formed opposite to each other across the discharge port 65 in the circumferential direction (left-right direction in FIG. 10) of the developer discharge portion 22*h*. The guide ribs 65*a* extend along the axial direction (the arrow-AA' direction) of the developer discharge portion 22*h*, and project substantially horizontally from the outer circumferential surface of the developer discharge portion 22*h*.

The pressing protrusions 65*b* are formed along a brim part of the discharge port 65 so as to surround the discharge port 65, and project from the outer circumferential surface of the developer discharge portion 22*h*. When the shutter 70 is attached to the developer discharge portion 22*h* and arranged at the closing position, the pressing protrusions 65*b* are opposite to the seal affixing surface 70*a* of the shutter 70. Lower end parts of the pressing protrusions 65*b* are all on a same flat plane. That is, as shown in FIG. 11, the pressing protrusions 65*b* are all spaced from the seal affixing surface 70*a* by a same distance d1. The distance d1 is smaller than a thickness d2 of the seal member 76 in a state without any external force applied to the seal member 76.

As shown in FIG. 10, the shutter 70 is a flat-plate shaped member attached to the developer discharge portion 22*h*. The shutter 70 includes the seal affixing surface 70*a*, engagement portions 70*b*, and a spring guide portion 70*c*. The seal affixing surface 70*a* is a flat surface, faces the discharge port 65 of the developer discharge portion 22*h*, and has the seal member 76 fixed thereon.

The engagement portions 70*b* are a pair of engagement portions 70*b* formed opposite to each other across the seal affixing surface 70*a* in the circumferential direction of the developer discharge portion 22*h* (the left-right direction in FIG. 11). The engagement portions 70*b* are U-shaped in section so as to hold the guide ribs 65*a* in an up-down direction. By engaging the engagement portions 70*b* with the guide ribs 65*a*, the shutter 70 is supported to be slidable along the axial direction of the developer discharge portion 22*h*.

The spring guide portion 70*c* is disposed upstream of the seal affixing surface 70*a* with respect to a direction (the arrow-A direction) in which the shutter 70 moves to the closing position, and is formed in a rib shape parallel to the axial direction of the developer discharge portion 22*h*. In the spring guide portion 70*c*, one end part of the coil spring 75 is inserted. The other end part of the coil spring 75 is fixed to a spring receiving portion 77 formed in the development container 22.

The seal member 76 is fixed by adhesion to the seal affixing surface 70*a* of the shutter 70. The seal member 76 can be made of an elastic material such as sponge, nonwoven fabric, felt, nylon flocked pile, or the like. According to the present embodiment, the seal member 76 is formed of a PORON/nylon pile sheet made by stacking a nylon pile sheet and an urethane foam sheet (PORON; registered trademark) one on the other, and the seal member 76 is fixed on the seal affixing surface 70*a* with a double-stick tape such that its outer surface (a surface that comes into contact with the developer discharge portion 22*h*) is the nylon pile surface and its shutter-70 side surface is the PORON surface.

With the seal member 76 fixed to the shutter 70, when the developer discharge portion 22*h* is inserted into the connection portion 82*a* (see FIG. 7) of the conveying pipe 82, no developer adheres to the seal member 76. As a result, sliding load increase due to adhesion of developer to the seal member 76 does not occur, either, and thus the shutter 70 does not become stuck during its closing operation, and smoothly and securely slides from the opening position (see FIG. 12) to the closing position (see FIG. 13). Accordingly, leakage of developer through the discharge port 65 attributable to malfunction of the shutter 70 can be securely prevented.

Furthermore, when the shutter 70 is arranged at the closing position (see FIG. 13), the pressing protrusions 65*b* dig into the seal member 76 to bring the discharge port 65 and the seal member 76 into tight, gapless contact with each other. Accordingly, it is possible to securely prevent leakage of developer through the discharge port 65. For both smooth movement and sufficient sealing performance of the shutter 70, an amount (d2−d1) by which the pressing protrusions 65*b* dig into the seal member 76 is appropriately adjusted by taking into account the material and the thickness, for example, of the seal member 76, the sliding load on the shutter 70, etc.

In the present embodiment, the shutter 70 is flat-plate shaped, and the seal affixing surface 70*a* is a flat surface. The seal member 76, which is affixed to the seal affixing surface 70*b*, is also formed in a simple flat-plate shape. This makes it possible, in automatic production of the developing device 3*a* using a robot arm, with a double-stick tape affixed in advance to the seal affixing surface 70*a* of the shutter 70, to fix the seal member 76 to the seal affixing surface 70*a* just by aligning and pressing the seal member 76 with and against the seal affixing surface 70*a*. That is, the fixing of the seal member 76 to the shutter 70 can be accomplished with just a simple linear movement.

Accordingly, there is no need of such operation of fixing a seal member along an arc shape of a shutter as is performed in the conventional structure, and thus the structure according to the present embodiment is suitable for automatic production performed by a robot arm. Note that as long as the seal affixing surface 70*a* is a flat surface, it is possible to simplify the operation of fixing the seal member 76 to the shutter 70, and thus the shutter 70 does not necessarily need to be formed in a flat-plate shape.

Further, as shown in FIG. 11, the shutter 70 is attached to the outer circumferential surface of the developer discharge portion 22_h_ which is cylindrically shaped, and the pressing protrusions 65_b_ formed on the brim part of the discharge port 65 and the seal member 76 are brought into pressure contact with each other, whereby the discharge port 65 is closed. Thus, of the developer discharge portion 22_h_, the part including the discharge port 65 can have the same circular sectional shape with the same diameter as the other parts, and thus there is no need of reducing the outer diameter of the discharge blade 53 arranged inside the developer discharge portion 22_h_. Accordingly, it is possible to maintain the force with which the discharge blade 53 conveys the developer.

The embodiments described above are in no way meant to limit the present disclosure, which thus allows for many modifications and variations within the spirit of the present disclosure. For example, the developer conveying mechanism according to the present disclosure is not limited in application to the developer discharge portion of the developing device 3_a_ as shown in FIG. 2 which performs replenishment of two-component developer and discharge of surplus developer, but is applicable to various portions that convey developer using a pipe-shaped path in an image forming apparatus. Note that "developer" to be conveyed by the developer conveying mechanism according to the present disclosure includes two-component developer including toner and magnetic carrier, one-component developer including only toner, waste toner supplied from two-component developer onto an image carrier and collected from the image carrier, etc.

For example, the present disclosure is applicable also to a case where, in a developer conveying mechanism that conveys waste toner removed from the photosensitive drums 1_a_ to 1_d_ by the cleaning devices 7_a_ to 7_d_ shown in FIG. 1 or waste toner removed from the surface of the intermediate transfer belt 8 by the belt cleaner 19 to a waste toner collecting container by using a pipe-shaped path and a conveying screw, the developer conveying mechanism is detachably attached with respect to the color printer 100, and a shutter is provided to open and close the discharge port of the pipe-shaped path to prevent leakage of the waste toner. Furthermore, the present disclosure is applicable also to a case where a shutter is provided to open and close a toner replenishing port of each of the toner containers 4_a_ to 4_d_ to prevent leakage of replenishment toner.

Moreover, the present disclosure is applicable not only to tandem-type color printers as shown in FIG. 1 but also to various types of image forming apparatuses, such as digital and analog monochrome copiers, color copiers, and facsimile machines.

The present disclosure is usable in developer conveying mechanisms for use in electrophotographic image forming apparatuses such as a copier, a printer, a facsimile machine, a multifunction peripheral having these functions, etc. By using the present disclosure, it is possible to achieve a developer conveying mechanism that is capable of securely preventing leakage of developer through a developer discharge port formed in a path through which developer is conveyed, and in which a shutter for opening and closing the developer discharge port smoothly operates.

What is claimed is:

1. A developer conveying mechanism, comprising:

a pipe-shaped conveying path that conveys developer and includes a discharge port formed in part of a side surface thereof;

a shutter that is slidably attached along an outer circumferential surface of the pipe-shaped conveying path, and that is selectively arranged at a closing position overlapping with the discharge port and an opening position retreated from the discharge port;

a seal member that is fixed to a seal affixing surface of the shutter, the seal affixing surface being opposite to the discharge port; and a biasing member that biases the shutter toward the closing position, wherein the shutter includes the seal affixing surface, which is a flat surface, and a pair of engagement portions that are opposite to each other across the seal affixing surface in a circumferential direction of the pipe-shaped conveying path; and the pipe-shaped conveying path includes a pair of guide ribs that are opposite to each other across the discharge port in the circumferential direction of the pipe-shaped conveying path, and with which the pair of engagement portions slidably engage.

2. The developer conveying mechanism according to claim 1, wherein the seal member is formed of an elastically deformable material.

3. The developer conveying mechanism according to claim 2, wherein the pipe-shaped conveying path includes a plurality of pressing protrusions that are formed so as to surround the discharge port and that protrude from an outer circumferential surface of the pipe-shaped conveying path; and when the shutter is arranged at the closing position, the pressing protrusions are spaced from the seal affixing surface by a distance that is smaller than a thickness of the seal member with no external force applied to the seal member.

4. The developer conveying mechanism according to claim 3, wherein the plurality of pressing protrusions are all spaced from the seal affixing surface by a same distance.

5. The developer conveying mechanism according to claim 1, wherein the shutter has a flat plate shape.

6. The developer conveying mechanism according to claim 1, wherein a part of the pipe-shaped conveying path including the discharge port has a circular cross-sectional shape with a same diameter as other parts.

7. An image forming apparatus comprising the developer conveying mechanism according to claim 1.

8. A developing device, comprising:

a development container in which two-component developer including carrier and toner is stored;

a developer replenishing port through which developer is replenished into the development container; and a developer discharge portion through which surplus developer is discharged out of the development container, wherein the developer conveying mechanism according to claim 1 is used as the developer discharge portion.

9. An image forming apparatus comprising the developing device according to claim 8.

* * * * *